June 21, 1955 C. W. MOTT 2,711,067
FLAIL-TYPE MOWER STRUCTURE
Filed Nov. 30, 1953 2 Sheets-Sheet 1

INVENTOR.
Earl W. Mott
BY Paul O. Pippel
Atty.

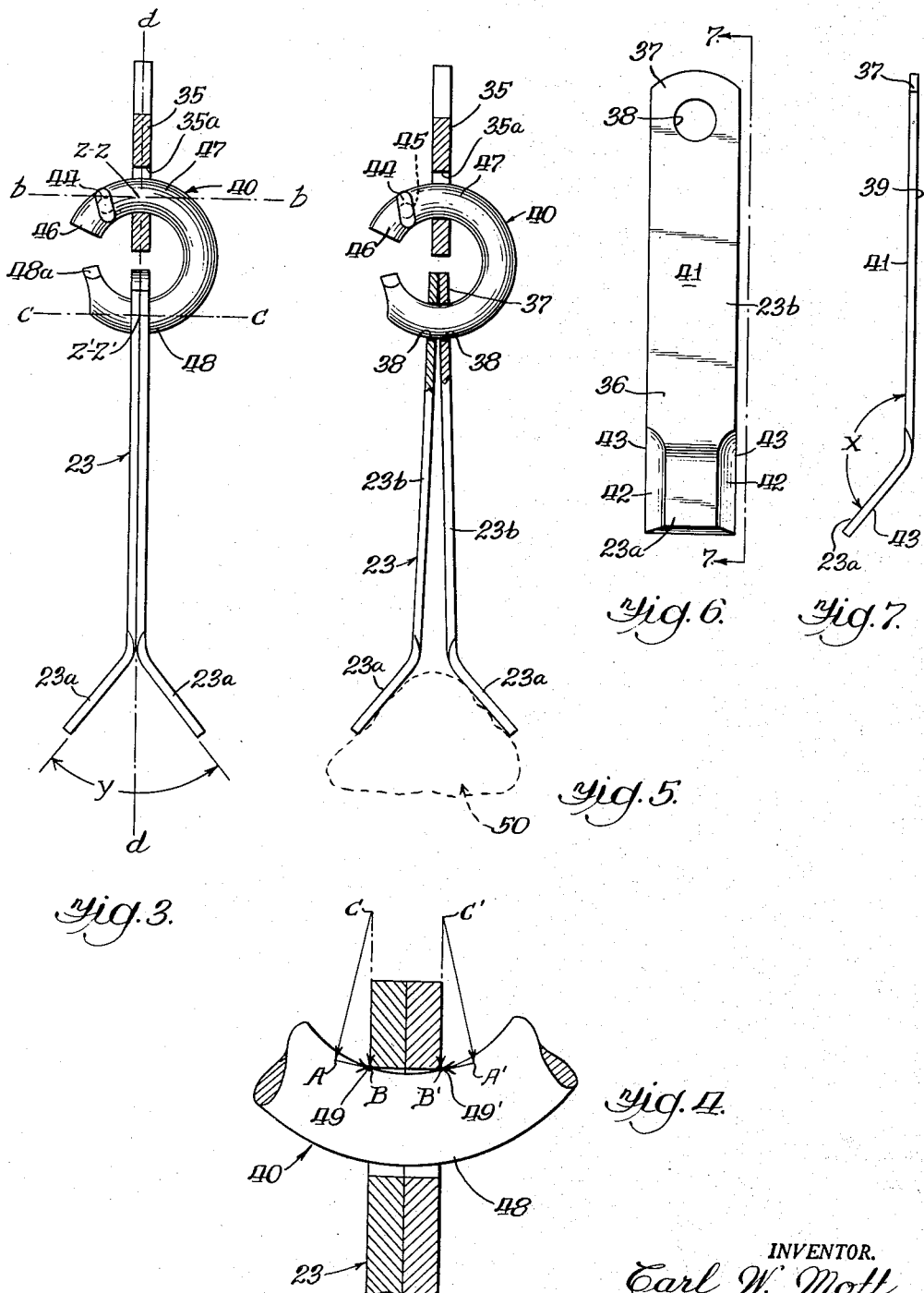

United States Patent Office 2,711,067
Patented June 21, 1955

2,711,067

FLAIL-TYPE MOWER STRUCTURE

Carl W. Mott, Lake Ozark, Mo.

Application November 30, 1953, Serial No. 395,159

8 Claims. (Cl. 56—289)

This invention concerns grass-cutting mowers of the character employing flails swingably mounted upon a rotatable carrier which when rotating at high speed causes the flails to project radially therefrom to enable cutting edges upon their outer ends to encounter the grass for cutting the same, and relates more particularly to improvements in means for interconnecting the carrier and flails.

The present invention relates to mowers and mower flails of the type disclosed in my United States Patent 2,590,065 titled "Mower Structure." In the patented machine flails of an abortive J-shape are employed in pairs with the stems or shanks of the flails arranged in back-to-back relation while cutter end portions respectively thereof project divergingly from the outer ends thereof for cutting adjacent miniature swaths of grass. The inner ends of the paired flail shanks of the patented machine are pivotally connected with the carrier for swinging relatively thereto about an axis spaced radially from and in parallelism with the rotational axis of the carrier. This pivoting of the flails upon the carrier of the prior machine enables the flails to yield relatively to the carrier circumferentially thereof upon accidentally encountering a hard object and thus save wear and tear upon the flails. Further preservation of the flails is attributable to the ability of the paired shanks to bend into slight diverging relation and thus facilitate separation of the cutter end portions axially of the carrier and transversely of their path of revolution about the rotational axis of the carrier and thus straddle narrow immovable objects so as to avoid being broken thereby.

An object of the present invention is the provision of an improved mounting means of the flails upon the carrier, wherein the flails are universally pivotally or swingably connected with the carrier to facilitate their displacement, without bending, when encountering a hard immovable object.

A more specific object is the provision of link means pivotally connected with the rotatable carrier at an inner section of such link means and pivotally connected at an outer section thereof with the flails to provide a double articulation between the flails and the carrier and to also diminish the length of the flail shank and the mass of the flails whereby they are more readily deflectible from an impenetratable object and correspondingly less vulnerable to injury.

A further object is the provision in a flail-type mower of link means having an inner pivot section pivotally connected with the rotatable carrier to swing relatively to the carrier about an axis in parallelism with and spaced radially from the rotational axis of the carrier and having outer bearing sections converging radially outwardly from the carrier, together with contiguous flail shanks mounted respectively upon the converging bearing sections which enable the flails to pivot universally thereon and to separate from one another but which in response to centrifugal force imposed thereon by the mass of the flails during rotation of the carrier set up reactive force components yieldably urging the paired flails together.

A further object is the provision of a novel flail mounting link having a pair of flails swingably mounted thereon and such link being detachably and swingably mounted upon the rotatable carrier.

The above and other desirable objects inherent in and encompassed by the invention are elucidated in the ensuing description, the appended claims and the annexed drawings, wherein:

Fig. 3 is an enlarged partial sectional view taken on the line 3—3 of Fig. 2, illustrating one of the connecting links and the manner of its connection with the carrier and a pair of cutter flails;

Fig. 4 is an enlarged fragmentary sectional view, taken in the plane common to the lines b—b and d—d in Fig. 3, showing details of upper end portions of the flails as shown in Fig. 3 together with vector diagrams of forces existing between the flails and the link upon which they are mounted during rotation of the carrier.

Fig. 5 is a view taken similarly to Fig. 3 but showing the flails separated by a hard impenetrable object shown in dotted outline;

Fig. 6 is an enlarged side elevational view of one of the flails;

Fig. 7 is an edgewise elevational view of the flail shown in Fig. 6 and taken in the direction indicated by the arrows associated with the line 7—7 in Fig. 6.

Figure 1:
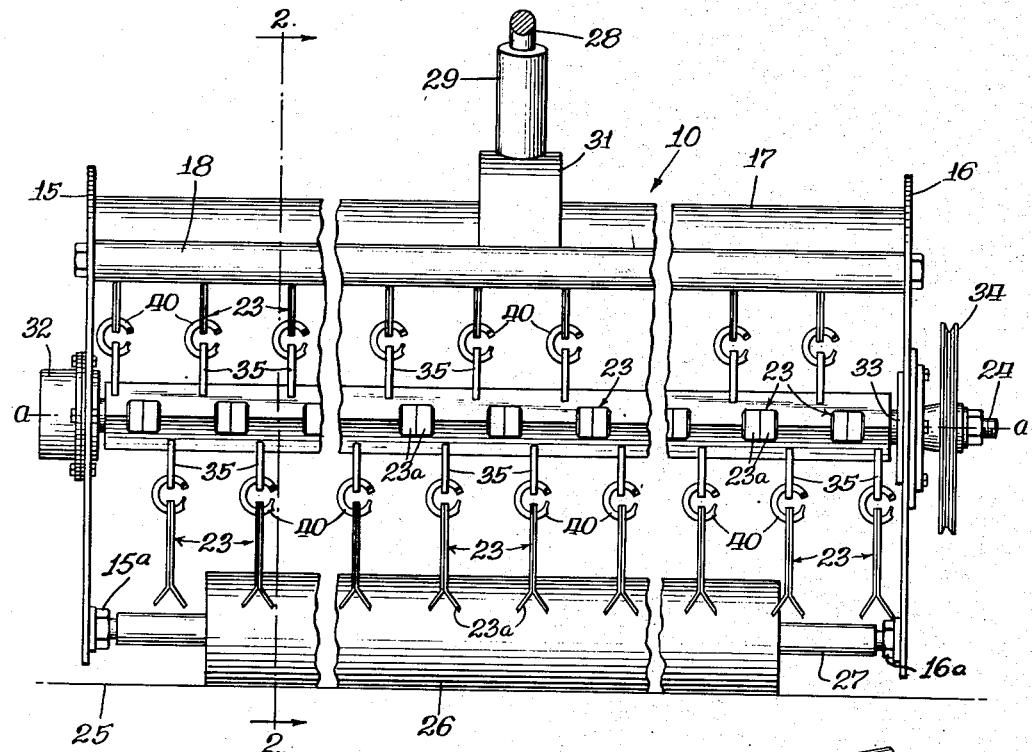
Fig. 1 is a front elevational view of a mower unit constructed according to the principles of the present invention.
Figure 2:
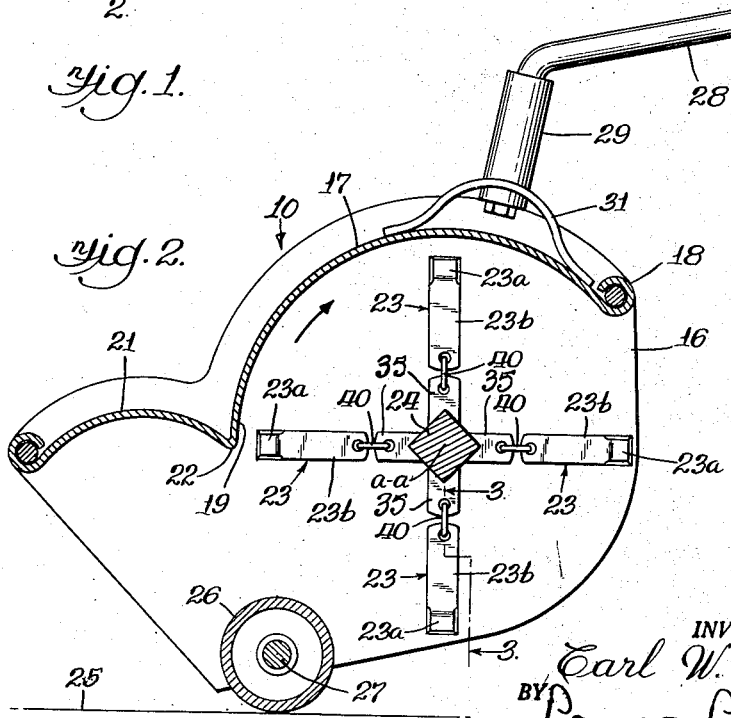
Fig. 2 is a transverse sectional view taken on the line 2—2 of Fig. 1.

A mower unit 10 in which the present invention is useful is shown in Figs. 1 and 2. This unit includes a rotatable carrier casing including end walls 15 and 16 and a semi-cylindrical cover shroud 17 extending between the walls 15 and 16 and lengthwise of the unit. Cover shroud 17 has a front edge 18 and a rear edge 19, thereby providing an open front side of the rotor or carrier chamber beneath the edge 18, an open bottom side of such chamber and the open lower portion of the rear side of the chamber beneath the rear edge 19. A deflector wall 21, which is arched transversely extends lengthwise between the end walls of the unit 10 and has a front edge 22 disposed adjacently to the rear edge 19 of the cover shroud and also adjacently to a circular path traversed by the outer ends of flails 23 during rotation of a carrier 24 upon which such flails are pivotally or swingably mounted. The carrier 24 which is in the form of a shaft having a square cross section rotates in the direction indicated by the arrow in Fig. 2, whereby the flails 23 are caused to cut grass or the like of which the stems project upwardly from a ground line 25 and sweep the cut grass stems rearwardly through a discharge space beneath the rear edge 19 of the shroud 17 and beneath the arched deflector wall 21. Disposal of the front edge of the deflector wall 21 adjacent to the circular path traversed by the outer ends of the flails enables this deflector wall to intercept the grass stems cut off and precipitated by the flails 22 and prevent these grass stems from being carried upwardly and forwardly beneath the shroud 17, which action would cause accumulation of such stems in front of the unit so that its operation would be impeded.

When the unit is in operation, it is partly carried by a long cylindrical ground-engaging roller 26 journalled upon a bearing rod 27 extending between the casing end walls 15 and 16 whereon it is mounted at 15a, 16a. Stabilization of the unit upon the ground-engaging roller 26 is obtained by means of a stabilizer rod 28 having a lower end portion disposed within a socket 29 secured to the shroud 17 by a bracket 31. The stabilizer rod 28 is for attachment to the frame of a power driven vehicle, not shown, employed for propelling the unit 10 and providing power for the rotation of its carrier 24.

The casing end wall 15 supports a bearing unit 32 for journalling one end of the carrier 24 while a bearing unit 33 in the end wall 16 rotatably supports the opposite end of the carrier. The carrier projects through wall 16 and the bearing unit 33 where an end portion thereof has a pulley 34 fixed thereto for being power driven through a belt, not shown.

Carrier 24 has a plurality of apertured ears 35 projecting radially therefrom. These apertured ears 35 are arranged in four rows extending lengthwise of the carrier. Each row of ears spaced apart axially of the carrier registers with a respective corner of the square sectioned carrier; see Figs. 1 and 2. The apertured ears 35 occupy a spiral path extending in a clockwise direction (Fig. 2) about the axis $a$—$a$ of the rotor, that is, the upwardly projecting ear 35 in Fig. 2 is nearest to the observer, the ear projecting rightward from the carrier is slightly farther from the observer a sufficient distance that the cutter end portions 23a of the paired flails 23 associated therewith will cut a swath slightly overlapping with the cutting end portions of the flails associated with the visible upwardly projecting ear 35. The downwardly projecting ear 35 visible in Fig. 2 is slightly farther than the rightwardly projecting ear from the observer a distance that the swath cut by the cutter end portions of the paired flails 23 thereon will only slightly overlap with the swath cut by the flails mounted on the rightwardly projecting ear 35. The leftwardly projecting ear 35 visible in Fig. 2 is still farther from the observer axially of the carrier 24 whereby the miniature swaths cut by the cutter end portions of the paired flails 23 thereon will only slightly overlap with the swaths cut by the flails on the downwardly projecting ear 35. The upwardly projecting ear 35 immediately behind the visible ear 35 in Fig. 2 is spaced endwise of the shaft 24 more distantly than the visible ear 35 projecting leftward in Fig. 2, and so on. Thus the placement of the apertured ears 35 upon the carrier 24 is such that the paired flails respectively associated therewith are in staggered relation such that the flails cut respective swaths which overlap axially of the carrier only a slight amount with the swaths upon respective opposite sides thereof cut by other flails upon the carrier.

An individual flail 23 is illustrated in Figs. 6 and 7. All flails are alike. Each flail 23 is a rigid strap-like member comprising a flat shank 23b in addition to the cutter end portion 23a which projects from the outer end 36 of such shank. An inner end 37 of the shank 23b contains an eyelet opening 38. In Fig. 7 a back side of the flail shank is designated 39 while the obverse side thereof is designated 41. Cutter end portion 23a extends angularly therefrom the outer end portion 36 of the shank to form therewith an included angle X which is in excess of 90 degrees. Opposite edge portions 42 of the cutter end portion 23a are beveled to provide cutting edges 43.

C-links 40 constitute link means for swingably attaching each pair of the flails 23 to a respective of the apertured ears 35. Prior to inserting retainer means in the form of a cotter key 44 through a hole 45 in one end portion 46 of each C-link 40, such end portion 46 is threaded through the eyelets 38 of a pair of flails disposed in back-to-back relation as illustrated in Fig. 3. These flails are slid upon the link 40 past an inner pivot or connecting section 47 having an axis $b$—$b$ to an opposite or outer pivot connecting portion having an axis $c$—$c$. A flattened head 48a at the opposite end of the link 40 has a diameter in excess of the eyelets 38 to prevent accidental displacement of the flails from this end of the link. Next, each link with the pair of flails 23 disposed thereon for swinging relatively thereon about the axis $c$—$c$ has its end portion 46 inserted through the hole 35a of a respective apertured ear 35 and the cotter key 44 then assembled with the opening 45 to prevent disassociation of the link from the apertured ear. Thus the apertured ears 35 constitute means pivotally connecting the inner pivot sections 47 of the link means 40 with the carrier 24 for swinging movement relatively to the carrier about respective axes $b$—$b$ disposed in parallelism with the carrier axis $a$—$a$. The link means 40 are so oriented by the association of their inner pivot sections 47 with the apertured ears 35 that the axis $c$—$c$ of the outer pivot sections 48 of the linking means normally cause the paired flails 23 to swing within a plane $d$—$d$ which is normal to the carrier axis and bisects the angle Y subtended by the diverging cutter end portions 23a.

Referring now to Fig. 4, the outer pivot section 48 of the fragmentarily shown link 40 comprises contiguous bearing surfaces 49 and 49' converging radially outwardly of the carrier axis $a$—$a$ within a plane common to said axis and said bearing surfaces during radial outward disposition of the link means 40 attributable to centrifugal force thereof during rotation of the carrier. The radial outward centrifugal force of the leftmost flail 23 of Fig. 4 is represented by the force vector CB applied at the point B on the bearing surface 49. This force vector CB is divided into the vector components CA and AB. The vector force C' B' developed by the rightmost flail 23 in Fig. 24 is applied to the bearing surface 49' at point B' to create the force components represented by the vectors C' B' and A' B'. Therefore the bearing surfaces 49 and 49' are operable by virtue of centrifugal force of the flails thereon to exert reactive force components AB and A' B' on such flails to impositively urge the inner ends 37 of the flail shanks into contiguity.

Although the centrifugal force acting upon the flails 23 during rotation of the carrier cooperates with the link means 40 in creating force components pressing the paired flails in back-to-back relation, such force components are impositive in character and the flails are capable of pivoting upon bearing surfaces 49 and 49' to divergingly separate the flail shanks in the manner illustrated in Fig. 5 should the cutter end portions 23a of these flails encounter an impenetratable object 50. Thus while the link means 40 normally maintain the flails oriented as illustrated in Fig. 3 with the axis $b$—$b$ and $c$—$c$ in parallelism with the carrier axis $a$—$a$, the flails 23 are capable of universal movement responsively to deflecting forces of substantial magnitude imparted thereto. Should such a force be imparted in the same sidewise direction to both of the paired flails they and the associated link 40 can pivot to a limited extent relatively to the associated apertured ear 35 about an axis $z$—$z$ seen as a point in Fig. 3. An additional angular movement may take place for the flails relatively to link 40 about an axis $z'$—$z'$ seen as a point in Fig. 3. The link therefore has universal movement to the apertured ear 35 about the perpendicular axes $b$—$b$ and $z$—$z$ and the flails have universal pivotal movement relative to the outer pivot section 48 of the link 40 about the axes $c$—$c$ and the $z'$—$z'$. This non-rigidity of mounting for the flails 23 facilitates their deflecting together or separately in any necessary direction relative to the carrier to diminish the likelihood of injury thereto by a relatively immovable hard object. Such articulated character of the flail mountings in nowise impairs the functional service of the flails since their mass is made sufficient that their inertia will maintain them in the desired orientation and paths of revolution about the carrier axis sufficiently for cutting swaths through the stems of vegetation growth intended to be treated by the machine.

Having thus described a single preferred form of the invention with the view of clearly and concisely illustrating the same, I claim:

1. In a flail-type mower, a carrier having a principal axis about which it is rotatable, a flail connecting link spaced-apart connecting sections, means pivotally connecting one of said link sections with the carrier to accommodate pivoting of the link relatively to the carrier about an axis spaced radially from the carrier structure axis and generally in parallelism therewith, a pair of rigid strap-like cutter flails each comprising a flat shank with a back face and inner and outer ends, said flail shanks being disposed with their back faces in opposed contiguous parallelism, means pivotally connecting the inner ends of the flail shanks with the link at the other of the spaced-apart connecting section thereof to accommodate pivoting of the flails relatively to the link about an axis substantially parallel with the carrier axis while the shanks are disposed in planes normal to the carrier axis, said pivotally connecting means for the inner ends of the flail shanks also accommodating pivoting of the shanks relatively to the link and to one another to assume a relation of divergence wherein their outer ends are separated axially of the carrier, and the flails also comprising respective flat outer end portions projecting from the outer ends of their shanks radially outwardly from the carrier axis at an angle of inclination with respect thereto and in diverging relation with respect to one another.

2. In a flail-type mower, a carrier having a principal axis about which it is rotatable, a cutter flail comprising a shank having inner and outer ends and a cutter end portion projecting from the outer end of the shank in diverging relation to form an included angle therewith in excess of 90 degrees, and link means disposed between the inner end of the flail shank and the carrier, said link means having inner and outer pivot sections, means pivotally connecting the inner pivot section of the link means with the carrier in radially spaced relation to its axis to accommodate pivotal swinging of the link means relatively to the carrier in a plane normal to the carrier axis, the inner end of the flail shank being pivotally connected with the outer pivot section of the link means to swing relatively thereto within a plane normal to the carrier axis and also within a plane perpendicular to such normal plane and parallel with the carrier axis, and said link means being operable through the connecting means at its inner pivot section and through the connection of its outer pivot section with the flail to normally maintain the flail so oriented that the cutter end portion is in diverging relation to the carrier axis.

3. In a flail-type mower, a carrier having a principal axis about which it is rotatable, a pair of cutter flails each comprising a shank with a back side and inner and outer ends, said flail shanks being disposed with their back sides in opposed contiguous parallelism, each flail also comprising a cutter end portion projecting angularly from the outer end of the shank thereof to form an included angle therewith in excess of 90 degrees, link means disposed between the inner ends of the flail shanks and the carrier, said link means having inner and outer pivot sections, means pivotally connecting the inner pivot section of the link means with the carrier in radially spaced relation to its axis to accommodate pivotal swinging of the link means relatively to the carrier in a plane normal to the carrier axis, the inner end of each flail shank being universally pivotally connected with the outer pivot section of the link means, said link means being operable through said link means and its inner pivot section and through the connection of its outer pivot section with the flail shanks to normally maintain the flails so oriented that their cutter end portions are in diverging relation to one another and to the carrier axis, and the universal pivotal connections of the flails with the outer pivot section of the link means facilitating swinging motion of the flails relatively to the link means within a plane normal to the carrier axis and also facilitating swinging of the flails divergingly apart radially outwardly of the carrier and within a plane common to the carrier axis.

4. In a flail-type mower, a carrier having a principal axis about which it is rotatable, a pair of cutter flails each comprising a shank with a back side, an obverse side and inner and outer ends, said flail shanks being disposed with their back sides in opposed contiguous parallelism, each flail also comprising a cutter end portion projecting angularly from the outer end of the shank thereof to form an included angle with said obverse side in excess of 90 degrees, link means disposed between the inner ends of the flail shanks and the carrier, said link means having an inner pivot section, means pivotally connecting the inner pivot section of the link means with the carrier in radially spaced relation to its axis to accommodate pivotal swinging of the link means relatively to the carrier within a plane normal to the carrier axis, said link means also having an outer pivot section disposed radially outwardly of the carrier axis with respect to the inner pivot section attributable to centrifugal force acting upon such link means during rotation of the carrier, said outer pivot section having contiguous bearing surfaces converging radially outwardly of the carrier axis within a plane common to such axis during such radial outward disposition of the link means, the inner ends of said flail shanks being respectively and universally pivotally mounted upon said converging pivot sections of the link means, and said converging pivot section portions being operable by virtue of centrifugal force of the flails thereon during rotation of the carrier to exert force components urging the inner ends of the flail shanks into contiguity but facilitating spreading of the outer ends of the shanks and pivotal swinging of the shanks within a plane normal to the carrier axis.

5. In a flail-type mower, a carrier having a principal axis about which it is rotatable, a pair of cutter flails each comprising a shank with a back side, an obverse side and inner and outer ends, link means having an inner pivot portion pivotally connected with the carrier to swing relatively thereto within a plane normal to the carrier axis, said link means also having an outer pivot section pivotally connected with the inner ends of the flail shanks and cooperable with centrifugal force of such flails during rotation of the carrier and consequent revolving of the link means and flails about the carrier axis to yieldably urge the flail shanks into back side to back side relation axially of the carrier, said outer pivot connection of the link means also accommodating swinging of the flails relatively thereto within said plane and swinging of said flails relatively to one another within a plane common to the carrier axis and to said shanks, and said flails also comprising cutter end portions respectively upon the outer ends of said shanks and projecting endwise outwardly therefrom in diverging relation to define an angle bisected by said plane.

6. In a flail assembly for use in a flail type mower, a C-link having opposite ends in opposed relation, and a pair of cutter flails, each comprising a shank with a back side, an obverse side and inner and outer ends, said shanks each having an eye opening at its inner end, the principal axes of said openings extending perpendicularly to the back and obverse sides of their associated shanks and being threaded onto the C-link with the back sides of the shanks in opposed contiguous relation to define a plane therebetween, and said flails also comprising cutter end portions respectively upon the outer ends of their shanks and projecting endwise outwardly therefrom in diverging relation at respective sides of an angle bisected by said plane.

7. The combination set forth in claim 6, wherein there is a head at one end of the C-link to prevent stripping of the flails over such end, the other end of the C-link being threadable through the flail eyelet openings, and retainer means detachably associated with such other end of the C-link to prevent accidental stripping of the flails thereover.

8. The combination set forth in claim 7, including an apertured stud for anchoring the assembly to a rotary carrier therefor, and said stud being threaded onto the C-link between the flails and the retainer means.

References Cited in the file of this patent

UNITED STATES PATENTS

| 1,852,689 | Baxter | Apr. 5, 1932 |
| 2,175,504 | Ehmann | Oct. 10, 1939 |
| 2,580,640 | Bartch et al. | Jan. 1, 1952 |
| 2,590,065 | Mott | Mar. 18, 1952 |